(12) United States Patent
Kirkpatrick et al.

(10) Patent No.: US 7,441,007 B1
(45) Date of Patent: Oct. 21, 2008

(54) SYSTEM AND METHOD FOR ALLOWING APPLICATIONS TO RETRIEVE PROPERTIES AND CONFIGURATION INFORMATION FROM A PERSISTENT STORE

(75) Inventors: Mark A. Kirkpatrick, Conyers, GA (US); Darin J. Morrow, Acworth, GA (US); John A. Strohmeyer, Norcross, GA (US); Kent Corley, Alpharetta, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 965 days.

(21) Appl. No.: 09/916,323

(22) Filed: Jul. 30, 2001

(51) Int. Cl.
*G06F 15/167* (2006.01)
*G06F 12/00* (2006.01)
*G06F 17/30* (2006.01)

(52) U.S. Cl. ..................... 709/213; 707/203

(58) Field of Classification Search ......... 709/201–207, 709/229, 217–219, 227, 230, 233, 231, 220–226, 709/238, 213–215; 707/1–10, 332, 526, 707/200–203, 100; 713/1; 719/328–331; 717/100, 117–120, 172; 715/511–514
See application file for complete search history.

(56) References Cited

U.S. PATENT DOCUMENTS

| | | | |
|---|---|---|---|
| 5,388,255 A | 2/1995 | Pytlik et al. | |
| 5,732,218 A | 3/1998 | Bland | |
| 5,761,668 A | 6/1998 | Adamchick | |
| 5,813,017 A | 9/1998 | Morris | |
| 5,898,836 A | 4/1999 | Freivald et al. | |
| 5,943,662 A | 8/1999 | Baba | |
| 5,958,010 A | 9/1999 | Agarwal | |
| 5,958,016 A | 9/1999 | Chang | |
| 5,978,842 A | 11/1999 | Noble et al. | |
| 6,004,276 A | 12/1999 | Wright | |
| 6,038,542 A * | 3/2000 | Ruckdashel | 705/9 |
| 6,044,372 A | 3/2000 | Rothfus | |
| 6,047,280 A | 4/2000 | Ashby | |
| 6,047,323 A * | 4/2000 | Krause | 709/227 |
| 6,078,918 A * | 6/2000 | Allen et al. | 707/6 |
| 6,081,517 A * | 6/2000 | Liu et al. | 370/352 |
| 6,084,877 A * | 7/2000 | Egbert et al. | 370/389 |
| 6,085,030 A * | 7/2000 | Whitehead et al. | 709/203 |
| 6,085,222 A * | 7/2000 | Fujino et al. | 709/202 |
| 6,141,691 A * | 10/2000 | Frink et al. | 709/233 |
| 6,157,634 A * | 12/2000 | Mehta et al. | 370/351 |
| 6,163,776 A * | 12/2000 | Periwal | 707/4 |
| 6,202,096 B1 * | 3/2001 | Williams et al. | 709/230 |
| 6,226,637 B1 | 5/2001 | Carey | |
| 6,304,647 B1 | 10/2001 | Frost | |
| 6,411,697 B1 | 6/2002 | Creamer | |
| 6,453,356 B1 * | 9/2002 | Sheard et al. | 709/231 |
| 6,460,042 B1 | 10/2002 | Hitchcock | |
| 6,463,528 B1 * | 10/2002 | Rajakarunanayake et al. | 713/1 |
| 6,476,833 B1 * | 11/2002 | Moshfeghi | 345/854 |

(Continued)

*Primary Examiner*—Saleh Najjar
*Assistant Examiner*—Asad M Nawaz
(74) *Attorney, Agent, or Firm*—Withers & Keys, LLC

(57) ABSTRACT

The present invention provides a system and a method that employs a centralized properties server accessible from multiple applications using established computer network protocols. Applications that need configuration variables can make a request to the properties server. The server will then provide configuration values based on the attribute requested. Java applications may request property information by the use of the Java Remote Method Invocation and other applications may request information through a CORBA gateway server.

29 Claims, 4 Drawing Sheets

U.S. PATENT DOCUMENTS

| | | | |
|---|---|---|---|
| 6,484,214 B1 * | 11/2002 | Sundermier | 719/332 |
| 6,499,017 B1 | 12/2002 | Feibelman | |
| 6,513,038 B1 | 1/2003 | Hasegawa | |
| 6,526,423 B2 | 2/2003 | Zawadzki et al. | |
| 6,546,095 B1 | 4/2003 | Iverson | |
| 6,625,274 B1 | 9/2003 | Hoffpauir | |
| 6,629,098 B2 | 9/2003 | McGeorge | |
| 6,665,662 B1 | 12/2003 | Kirkwood et al. | |
| 6,697,824 B1 * | 2/2004 | Bowman-Amuah | 709/229 |
| 6,697,849 B1 * | 2/2004 | Carlson | 709/219 |
| 6,718,332 B1 | 4/2004 | Sitaraman | |
| 6,751,302 B1 | 6/2004 | Hoang | |
| 6,757,720 B1 * | 6/2004 | Weschler, Jr. | 709/220 |
| 6,782,508 B1 * | 8/2004 | Bahrs et al. | 715/526 |
| 6,801,920 B1 * | 10/2004 | Wischinski | 707/203 |
| 6,816,864 B2 | 11/2004 | Deuser | |
| 6,839,748 B1 | 1/2005 | Allavarpu | |
| 6,915,454 B1 | 7/2005 | Moore | |
| 6,917,944 B1 * | 7/2005 | Prasad et al. | 707/102 |
| 6,941,326 B2 | 9/2005 | Kadyk et al. | |
| 6,950,848 B1 * | 9/2005 | Yousefi'zadeh | 709/203 |
| 6,959,220 B1 * | 10/2005 | Wiser et al. | 700/94 |
| 6,961,760 B2 | 11/2005 | Li | |
| 6,999,570 B2 | 2/2006 | Alcott | |
| 7,000,236 B2 | 2/2006 | Kirkpatrick | |
| 7,062,452 B1 | 6/2006 | Lotvin | |
| 7,089,560 B1 * | 8/2006 | Uhler et al. | 719/311 |
| 7,191,209 B1 | 3/2007 | Kirkpatrick | |
| 7,289,964 B1 * | 10/2007 | Bowman-Amuah | 705/1 |
| 2001/0037361 A1 | 11/2001 | Croy | |
| 2001/0047279 A1 | 11/2001 | Gargone | |
| 2002/0019827 A1 * | 2/2002 | Shiman et al. | 707/200 |
| 2003/0046370 A1 | 3/2003 | Courtney | |

\* cited by examiner

SYSTEM AND METHOD FOR ALLOWING APPLICATIONS TO RETRIEVE PROPERTIES AND CONFIGURATION INFORMATION FROM A PERSISTENT STORE

FIELD OF THE INVENTION

The present invention relates to a system and method for an application properties server to provide properties and configuration information to clients. More particularly, the present invention relates to a system and a method for allowing applications software using established computer network protocols to retrieve configuration data from a dynamically maintainable database.

BACKGROUND OF THE INVENTION

Most computer software use configuration variables to alter their behavior without the need for regenerating code. This is most often done using text files. In today's Internet and networked environments this can cause administrative problems. This is largely because the same software application may be running on several machines, in several locations. Thus, for example, in order to alter uniformly the behavior of all software applications running a certain software application, all files need to be accessible by the text files. This requirement can cause a great expense and significant administration problems. For example, security considerations often dictate that a text file employed to alter a software application must be on the same machine that is running the code. Therefore, the configuration file often must be replicated over several machines. Accordingly, if changes are made on one software application, they must also be made on all of the other applications. Errors can occur if the changes are not made consistently on all of the applications.

In view of the foregoing, a need exists for a system and a method that can advantageously provide a properties server that is accessible from multiple systems, via a plurality of protocols, which serves to provide configuration values based on requests from the systems. More particularly, a need exists for a centralized properties server that is capable of providing configuration data from a maintainable, centralized storage medium, which is accessible from multiple clients running different network protocols.

SUMMARY OF THE INVENTION

The present invention is a system and a method that, ideally, employs a centralized properties server accessible from multiple applications software using multiple computer network protocols. According to the present invention, a system preferably provides for Java Remote Method Invocation ("RMI") and Common Object Request Broker Architecture ("CORBA") as the primary communications mechanisms between clients and a centralized property server, which maintains configuration data in a properties database. Additionally, a method is provided whereby a software application program that needs configuration variables can make requests to the properties server, which will respond by providing any available configuration values to the requesting application, preferably in a service broker framework.

According to embodiments of the invention, a properties server maintains and provides configuration data in a storage medium. Applications can make requests to the properties server for updated configuration data stored in a format such as a database or Lightweight Directory Access Protocol ("LDAP").

DETAILED DESCRIPTION OF THE INVENTION

Figure 1:
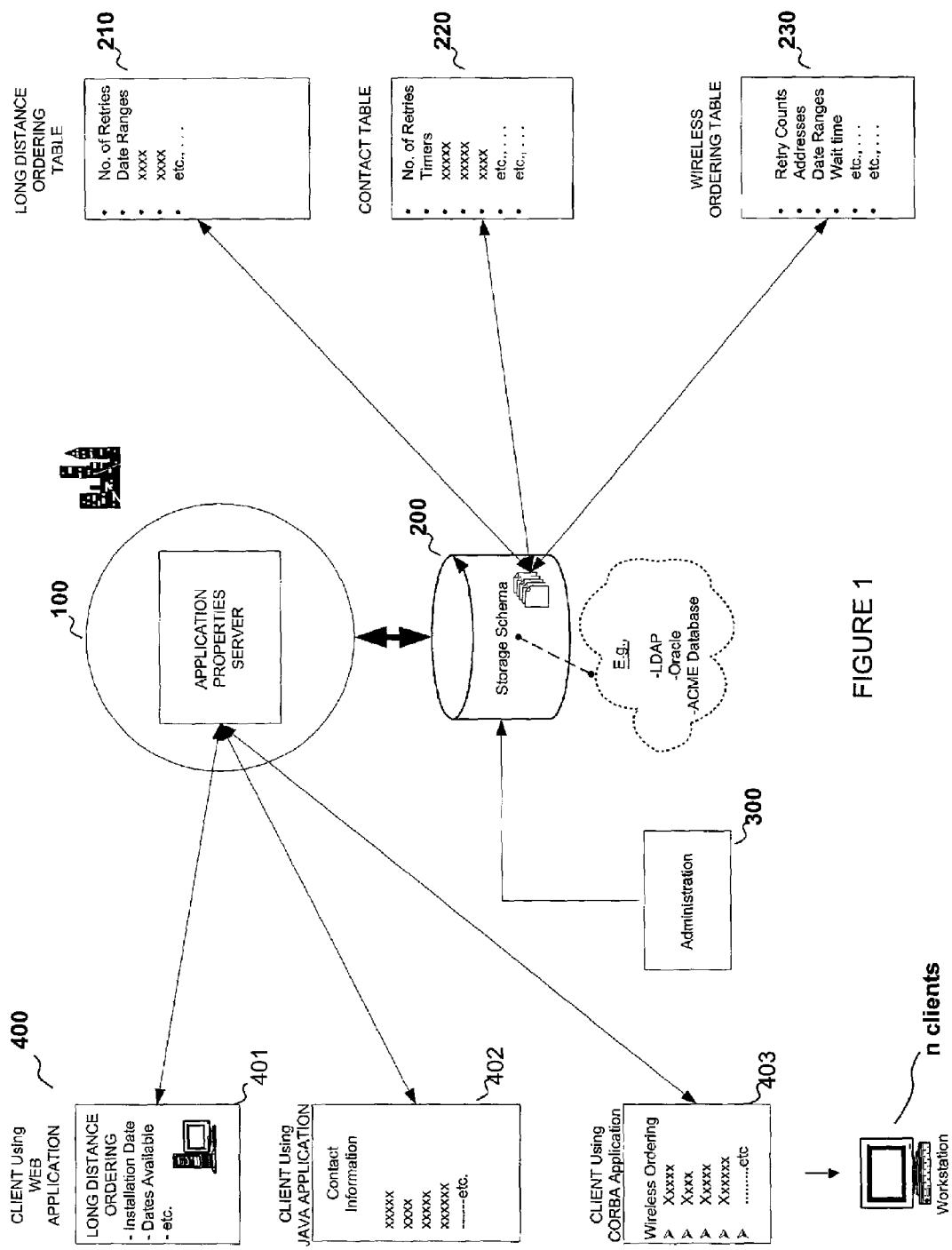
FIG. 1 is a schematic diagram representing an application properties server in accordance with one embodiment of the present invention.

FIG. 1 shows one embodiment of the present invention. In this exemplary embodiment, properties server 100 maintains configuration data in a storage medium 200 for a business such as a telephone provider. Alternatively, a network of servers may represent properties server 100. Clients 400, including client 401 using an internet web application, can make requests to the properties server 100 for configuration data stored in a storage schema such as, for example, a database. Storage medium 200 includes configuration information that is stored preferably in a set of tables. An administration system 300 is used to dynamically update storage medium 200. The information may be stored in a format such as a database or Lightweight Directory Access Protocol ("LDAP"). The information may be stored in another location or may be shared with other businesses. Client 401 may request updated configuration information related to, for example, long distance ordering information such as valid installation dates, available installation dates, or the allowable number of telephones.

Preferably, storage medium 200 contains a plurality of data tables such as long distance ordering table 210, contact table 220 and wireless ordering table 230. Properties server 100 provides configuration variables to client 401 by accessing storage mass 200 and searching the long distance ordering table 210 for the requested variables. Long distance ordering table 210 may contain, for example, available date ranges or the permissible number of retries. Similarly, and at the same time, a client 402 running a Java application program can use RMI via an RMI interface 120 (FIG. 2) to interact with properties server 100 and request configuration variables related to, for example, contact information from storage medium 200. Properties server 100 will then provide configuration variables based on the attributes requested by client 402 from contact table 220 stored in storage medium 200. Finally, a third client, running a CORBA application 403 may request configuration variables related to, for example, Wireless Ordering. Again, properties server 100 accesses storage medium 200 and now searches wireless ordering table 230 for the appropriate, requested configuration properties data and provides them to the client 430. Of course, any number n of clients may access properties server 100, depending upon system capacity.

Figure 2:
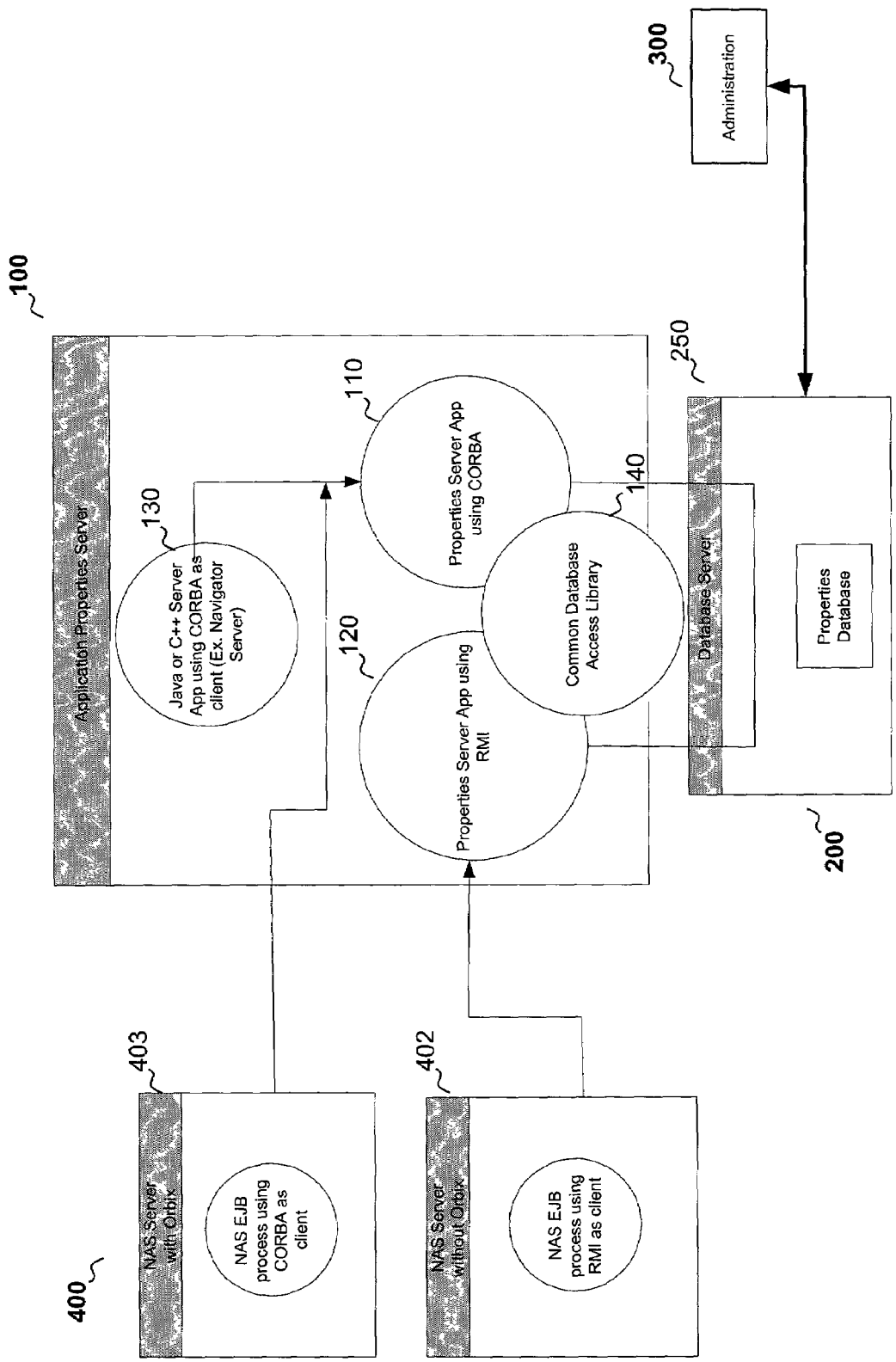
FIG. 2 is a schematic diagram representing an application properties server in accordance with one embodiment of the present invention.

FIG. 2 shows one exemplary architecture for the properties server 100 depicted in FIG. 1. In this embodiment, configuration data is preferably stored in a database 200. As will be appreciated by those skilled in the art, use of a database allows for good performance, data integrity, and a wide variety of data management tools to administer the configuration data via administration system 300. As will also be appreciated by those skilled in the art, storage medium 200 may be two or more databases located in separate geographical locations and in a variety of formats, e.g., ORACLE, ACME, LDAP, etc.

Referring to FIG. 2, a CORBA server application 110 runs a continuous process on a widely accessible system. This allows numerous server applications 130 using CORBA, as the client, to access properties server 100 for configuration data. Another server, RMI interface server 120 acts as a translator and runs continuously to handle RMI requests for properties data. For example, RMI interface server 120 could be used for Java clients 402 that do not have access to a CORBA Object Request Broker. Preferably, servers 110 and 120 use a common database access library 140 to directly interact with properties medium 200 via a database server 250. This architecture scheme has several benefits. With this architecture, changes in properties server architecture, for example, changes in the database or changes in database location, will not affect the server applications requesting configuration data. Additionally, any bugs found and corrected in the data access code would be reflected in both servers 110 and 120.

Figure 3:
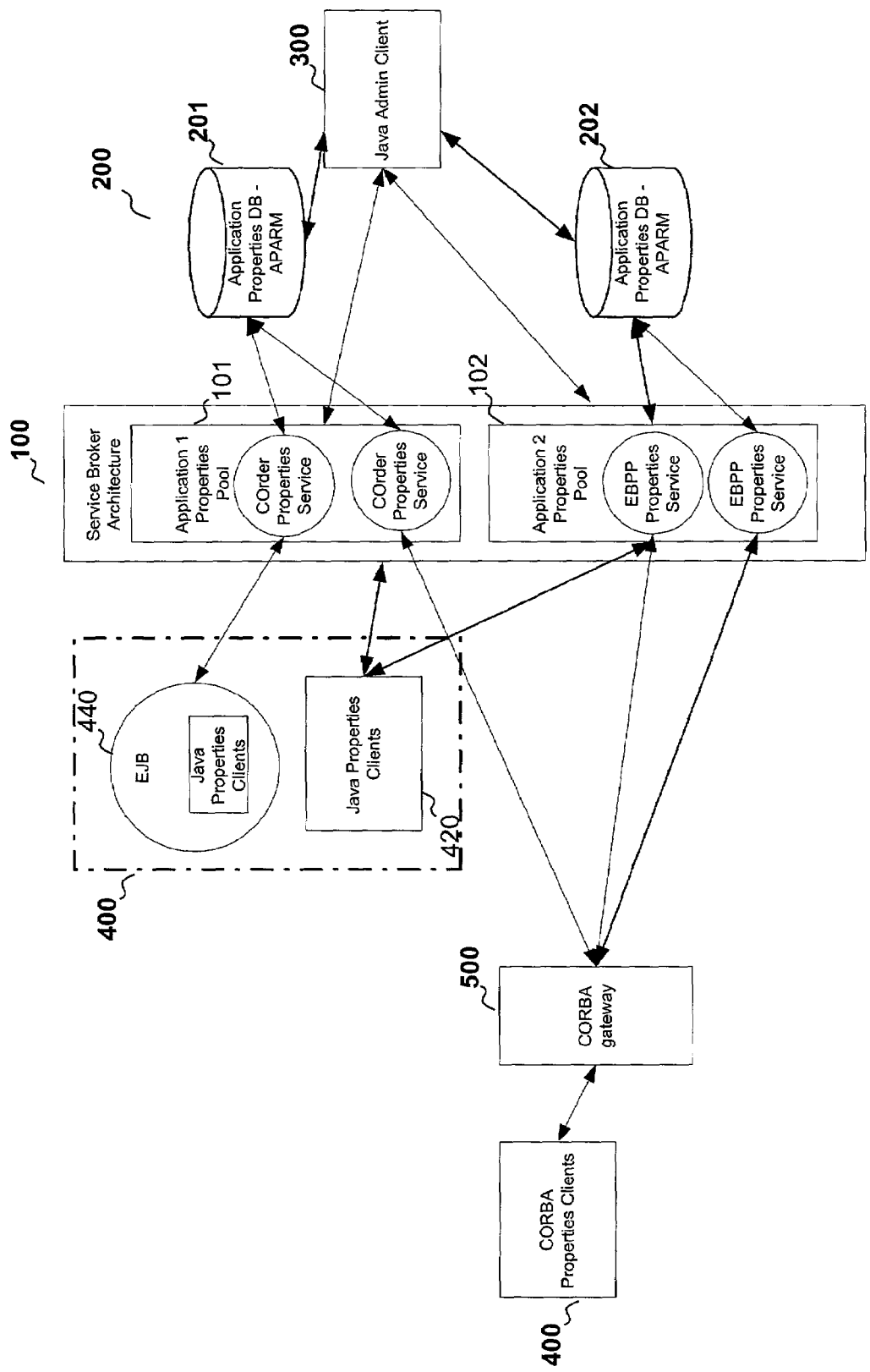
FIG. 3 is a schematic diagram representing a preferred architecture of an application properties server according to the present invention.

FIG. 3 depicts an exemplary architecture of the properties server 100 of the present invention. More specifically, FIG. 3 depicts a base Java RMI properties server architecture, depicting the interaction between clients 400, a CORBA gateway server 500 and exemplary base Java RMI properties server 100. Of course, as will be appreciated, while this implementation is an example of a base-RMI architecture, a similar design can use, for example, CORBA. The architecture shown in FIG. 3 allows Java applications to request property information by the use of Java RMI Application Programming Interface ("API"). A CORBA gateway 500 allows all other applications that do not use Java to request information through CORBA. Requests for configuration data are converted to a Java RMI request through CORBA gateway server 500.

Below, one embodiment of a service broker framework for properties server 100 is described. As shown in FIG. 3, application properties server 100 of this embodiment is implemented by a base Java RMI service in a service broker framework. In the preferred embodiment, this framework allows pooling and registration of standard services. The properties server 100 can be accessed by Java RMI clients 400 as remote objects referenced by the client. These clients can be, for example, stand-alone Java applications 420 or applications within another container such as an EJB or Servlet 440. There is also a command line administration client 300 that, for example, loads data into and administers the properties server and data schema 201, 202.

Next, the operation of properties server 100 depicted in FIG. 3 will be described in more detail. On startup, the service broker will initialize a number n of configurable property server objects 101, 102, . . . n. On initialization, each of the number n of server objects will create a connection to properties data schema 201, 202 . . . . There may be, for example, a pool of n server objects (i.e., meaning number n could be from one to many), which can be configured in a round-robin fashion, to a number n of clients. This example allows data schema 201, 202 . . . , and other system resources to be shared across a pool of n objects. As will be appreciated by those skilled in the art, with multiple copies, the load is spread across all the instances of the pool of instances. Additionally, with a service broker framework, property server 100 can be monitored and the property server's performance may be tuned through facilities implemented in the base framework.

The following is a representative example of an XML service broker configuration file for properties server 100:

```
<Service>
<Name>PropertiesService</Name>
<NumServiceObjects>2</NumServiceObjects>
<ClassName>.servicebroker.DBService</ClassName>
<DBHost>host22</DBHost>
<DBPort>1522<DBPort>
<DBName>billing</DBName>
<DBUserid>user1</DBUserid>
<DBPassword>userpw1</DBPassword>
<ConfigFile></ConfigFile>
</Service>
```

The tag names for the example XML service broker configuration file from above are described in the table below:

| Tag Name | Description |
| --- | --- |
| Name | Required by the service broker framework. Defines the name of the service. |
| NumServiceObjects | Required by the service broker framework. Defines the number of objects in the pool. |
| ClassName | Required by the service broker framework. Defines the Java class that implements the service broker service interface. |
| DBDriver | Required by service broker framework when communicating to the database. Defines the JDBC database driver that will be used. |
| DBConnectString | Required by service broker framework when communicating to the database. Defines the JDBC connection string that will be used. |
| DBHost | Required by service broker framework when communicating to the database. Defines the host name where the database resides. |
| DBPort | Required by service broker framework when communicating to the database. Defines the database port that the listener is running on. |
| DBName | Required by service broker framework when communicating to the database. Defines the database name. |
| DBUserid | Required by service broker framework when communicating to the database. Defines the database user id. |
| DBPassword | Required by service broker framework when communicating to the database. Defines the database user id. |
| ConfigFile | Additional configuration information. |

Thus, according to the preferred embodiment, upon startup, the service broker will read an XML configuration file, and establish a service for each service tag. In other words, the service broker will create an instance of an object that will implement the properties server service. There can be one or several of these, defining a pool of objects that are used in a round robin fashion. The pool size can be increased as the number of clients is increased. As will be appreciated by those skilled in the art, if property server 100 needs to talk to a different data schema 210, 220, another entry may be inputted for Tag "DBName" and Tag "ConfigFile", but leaving the same "ClassName".

Upon startup, the service broker architecture will implement a service for each service XML tag in its configuration file. One service being the PropertyService. The following is an example of a Java interface for implementing a PropertyService:

public interface PropertyService extends ServiceBrokerService {

```
public String getValueString(ApplicationKey appKey, String
key)
throws PropertyNotFoundException, PropertyServerExcep-
tion, RemoteException;
public Hashtable getValueHashtable(ApplicationKey app-
Key)
throws PropertyNotFoundException, RemoteException,
PropertyServerException;
public void setValueString(ApplicationKey appKey, String
key, String value)
throws RemoteException, PropertyServerException;
public void setValueHashtable(ApplicationKey appKey,
String key, Hashtable value)
throws RemoteException, PropertyServerException;
}
```

According to the exemplary embodiments discussed above, an interface defines the intersection between two objects. As will be appreciated by those skilled in the art, in terms of clients and servers, a client talks to the defined service and a server implements that service. According to the invention, the server can change but as long as the server still implements the same interface the client will not have to change.

An ApplicationKey is used to perform any operation where the client will have to pass in an application key object. This object tells the application server the application name and the version of the entry in the database. All entries are associated with both version and key information. The application constructor can be called with both an application name and a version or just an application name alone. Preferably, the value of "DEFAULT" will be used if no version is passed in. "Key" is used for a string value identifying the key to the property being requested. "String Value" represents a string representation of the value in the key value pair. "Hashtable Value" is a Hashtable representation of the hierarchy value requested. This hierarchy is represented as a hashtable, which, for example may be a set of key value pairs. Each value can have other hashtables in it creating a tree structure of hash tables within hashtables. The leaves of the tree are the actual properties.

Values can be stored and retrieved from the database 200 via "Key Value Pairs" or a "Hashtable Hierarchy." Key Value Pairs is the preferred retrieval method. According to an embodiment, the client will execute the "GetValueString" method call on the RMI object passing in a ApplicationKey object and a Key. The method will then return a value associated with the Key. Hashtable Hierarchy is another example of a retrieval method. This method allows the client to request many values at one time. Values are stored in a tree of hashtables where the key is a root value and the value points to another level in the tree or actual property values. Updates will remove the entire existing hierarchy with a cascaded delete and replace it with a new hierarchy.

Figure 4:
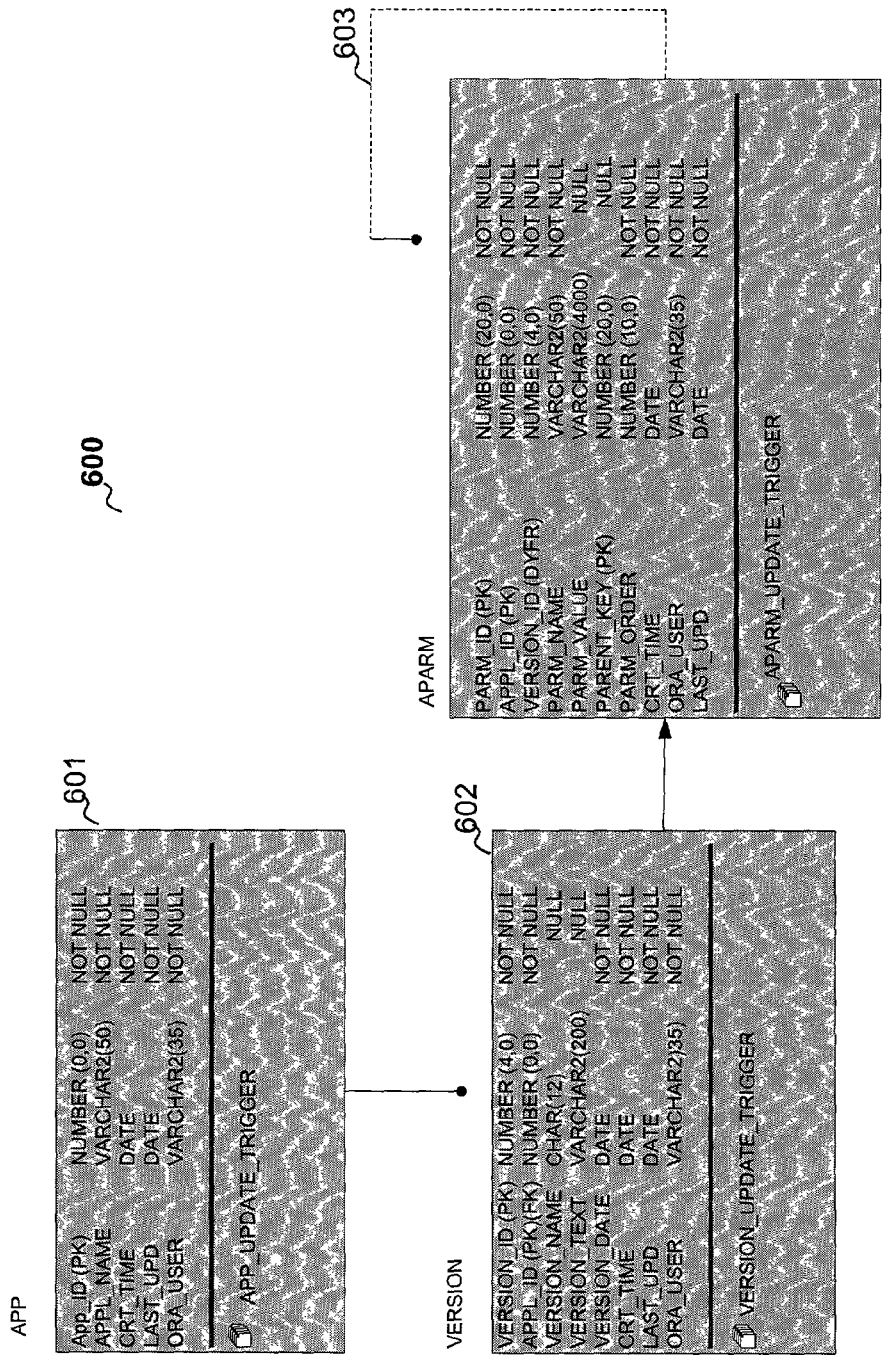
FIG. 4 is a schematic diagram representing a preferred architecture of a database schema in accordance with one embodiment of the present invention.

Next, a preferred data schema will be described. In the exemplary embodiments discussed above, the property server 100 maintains configuration data in a relational database 200. FIG. 4 depicts a preferred database schema 600. Properties server 100 accesses information through JDBC, i.e., Java Database Connectivity API. Preferably, information will be returned to the server 100 through hierarchical queries using the ConnectBy clause. An SQL command allowing rows to be joined in a hierarchical manner.

Referring to FIG. 4, APP table 601 maintains an entry for each application. The server 100 will insert a new row for each new application that is put in the database 200. Available procedures include: INSERT_APPLICATION(appl_id IN OUT NUMBER(0,0), appl_name IN). This procedure inserts a row into the application table. The procedure will return appl_id generated from a sequence if not supplied. A sequence is the equivalent of a database stored procedure that automatically generates unique keys. As will be appreciated, most modern database vendors have implemented this facility. The DELETE_APPLICATION(appl_name IN VARCHAR2(50)) procedure will delete an entry based on the application name.

VERSION table 602 maintains an entry for each version under each application. The server 100 will insert a new row for each new version put into the database. The INSERT_VERSION(version_id IN OUT NUMBER(0,0), appl_id IN NUMBER(0,0), version_name IN CHAR(12), version text) procedure will insert a row into the version table. It will return version_id generated from a sequence if not supplied. The DELETE_VERSION(version_name IN VARCHAR2(50), appl_name IN VARCHAR2(50)) procedure will delete an entry based on the version and application name.

The APARM table 603 contains the actual key value pairs. It also allows hierarchies to be built through the self referential parent key value. Node entries will refer to lower level entries in the same table and will not have an entry in the parm_value column. If the aparm entry is a leaf entry, the parm_value column will have the property string value. Procedures for the APARM table 603 include: INSERT_APARM (parm_id IN OUT NUMBER(0,0), appl_id IN NUMBER(0, 0), version_id IN NUMBER(0,0), parm_name IN VARCHAR2(50), parm_value). This procedure inserts a row into the aparm table 603. It will return parm_id generated from a sequence if not supplied. The DELETE_APARM (parm_name IN VARCHAR2(50), appl_name IN VARCHAR2(50), version_name IN VARCHAR2(50)) procedure will delete an entry based on the parm name for a specific version and application name. Preferably, it will also perform a cascaded delete to remove all dependent rows in the aparm table.

According to one exemplary embodiment, the client provides a method for maintenance of the database using the property server itself. Discussed below is an example of how to use the property server as a means for operations to maintain values that are contained in the database. Alternatively, a client that is based on a graphics user interface could be created. The client provides a command line interface to the property server. It allows properties to be retrieved and properties to be inserted into the database. Preferably, the program is command-line driven, using switches to indicate the action to perform. On Microsoft Windows NT systems, the application is launched using a batch file such as PropertyClient.bat. On Unix systems, the shell script PropertyClient.sh performs the same function. The following table contains a list of example switches.

| Switch | Description |
| --- | --- |
| -host <hostname> | Defines the hostname to connect to. If left blank it will default to localhost. |
| -load <filename> | The client can take two types of files to load the properties database: *.plist and *.properties files. |
| -key <key value> | Key for the property. |
| -version <version name> | Version name to set or retrieve the properties |

-continued

| Switch | Description |
|---|---|
| | under. DEFAULT if not supplied. |
| -app <application name> | Application name to put the properties under. |
| -hashkey <key value> | Parent key to return the property hashtable. |

An example of how to implement this embodiment is provided below:

Load data

Propertyclient-load order.plist-key order-app corder-version dev

Get Individual Property

Propertyclient-app corder-version dev-key databasehost

Get hashtable tree:

Propertyclient-app corder-version-dev-key order

Embodiments of the present invention relate to data communications via one or more networks. One or more communications channels of the one or more networks can carry the data communications. Examples of a network include a Wide Area Network (WAN), a Local Area Network (LAN), the Internet, a wireless network, a wired network, a connection-oriented network, a packet network, an Internet Protocol (IP) network, or a combination thereof. A network can include wired communication links (e.g., coaxial cable, copper wires, optical fibers, and so on), wireless communication links (e.g., satellite communication links, terrestrial wireless communication links, wireless LANs, and so on), or a combination thereof.

In accordance with embodiments of the present invention, instructions adapted to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions adapted to be executed. The term "adapted to be executed" is meant to encompass any instructions that are ready to be executed in their present form (e.g., machine code) by a processor, or require further configuration (e.g., compilation, decryption, or provided with an access code, etc.) to be ready to be executed by a processor.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. An application properties server containing multiple computing devices comprising:
   a plurality of client application servers operating applications using a plurality of computer protocols and requiring configuration variable data to configure the applications for operation;
   means for interfacing an application properties server with each of the plurality of client application servers, the means including a CORBA server application and a properties server application for handling RMI requests for configuration services;
   means for creating a plurality of configurable properties server objects within the properties server, wherein each of the plurality of configurable properties server objects is configured to one of the client application servers in a round-robin fashion;
   means for storing and maintaining a system of configuration variable data coupled to said properties server wherein the means for storing and maintaining comprises at least an APP table that maintains an entry for each application ID, a version table that maintains an entry for each version under each application ID and an APARM table that contains key-configuration variable data pairs associated with each version;
   means for interfacing each of the configurable properties server objects with the means for storing and maintaining a system of configuration variable data; and
   means for performing configuration services via the plurality of configurable properties server objects in response to configuration requests from said plurality of client application servers, said configuration services including providing configuration variable data to one of the plurality of the client application servers in response to receiving a request for configuration variable data from the one client application servers, wherein the configuration request includes at least an application ID and a key, wherein further the key is a data string that identifies the configuration variable data being requested.

2. The application server network according to claim 1, wherein said means for interfacing said plurality of client application servers with the properties server includes a common database access library, wherein said common database access library allows changes in said means for performing configuration services without affecting said plurality of client application servers.

3. The application server network according to claim 1, wherein said means for interfacing said plurality of client application servers with the properties server includes a database server coupled to said properties server application for handling RMI requests and said CORBA server application for interacting with said means for storing and maintaining configuration information.

4. An application properties server network containing multiple computing devices comprising:
   a plurality of client application servers operating applications using a plurality of computer protocols and requiring configuration variable data to configure the applications for operation;

means for interfacing an application properties server with each of the plurality of client application servers the means for interfacing further comprising a JAVA RMI Application Programming Interface;

means for creating a plurality of configurable properties server objects within the properties server, wherein each of the plurality of configurable properties server objects is configured to one of the client application servers in a round-robin fashion;

means for storing and maintaining a system of configuration variable data coupled to said properties server wherein the means for storing and maintaining comprises at least an APP table that maintains an entry for each application ID, a version table that maintains an entry for each version under each application ID and an APARM table that contains key-configuration variable data pairs associated with each version;

means for interfacing each of the configurable properties server objects with the means for storing and maintaining a system of configuration variable data; and means for performing configuration services via the plurality of configurable properties server objects in response to configuration requests from said plurality of client application servers, said configuration services including providing configuration variable data to one of the plurality of the client application servers in response to receiving an request for configuration variable data from the one client application servers, wherein the configuration request includes at least an application ID and a key, wherein further the key is a data string that identifies the configuration variable data being requested.

5. The application server network according to claim 4, further comprising a CORBA gateway.

6. The application server network according to claim 5, wherein said means for performing configuration services is implemented by a base JAVA RMI service in a service broker framework.

7. The application server network according to claim 6, wherein said service broker framework is implemented using at least one XML service broker configuration file.

8. The application server network according to claim 7, wherein said configuration information is stored and retrieved from said means for storing via key-configuration variable data pairs.

9. The application server network according to claim 7, wherein said configuration information is stored and retrieved from said means for storing via Hashtable Hierarchy.

10. A system for providing an application configuration service including multiple computing devices, the system comprising:

an application properties server, the application properties server including means for creating a plurality of configurable properties server objects wherein each of the plurality of configurable properties server objects is configured to one of the client application servers in a round-robin fashion;

at least one JAVA application program of a first client application computer, including application variables that configure the application for operation, networked with said application properties server, the first client application computer generating a request for configuration variable data to configure the application being implemented by the first client application computer;

at least one-CORBA application program of a second client application computer, including application variables that configure the application for operation, networked with said application properties server, the second client application computer generating a request for configuration variable data to configure the application being implemented by the second client application computer;

at least one Internet application program of a third client application computer, including application variables that configure the application for operation, networked with said application properties server, the third client application computer generating a request for configuration variable data to configure the application being implemented by the third client application computer;

one or more application programming interfaces coupled to the application properties server for receiving configuration service requests via a plurality of computer network protocols from each of the first, second, and third client application computers, wherein the requests include at least an application ID and a key, wherein further the key is a data string that identifies the configuration variable data being requested;

a common database access library coupling the one or more application programming interfaces;

at least one dynamically-maintainable configuration variable data schema coupled to said application properties server via the common database access library such that the application properties server accesses the configuration variable data in response to the configuration service requests, wherein the data schema comprise at least an APP table that maintains an entry for each application ID, a version table that maintains an entry for each version under each application ID and an APARM table that contains key-configuration variable data pairs, wherein further said common database access library allows changes in the at least one dynamically-maintainable configuration variable data schema without affecting the application properties server;

a service broker executing on the application properties server wherein the service broker initializes a plurality of configurable property server objects in response to a configuration service request each object creating a connection to the dynamically-maintainable configuration variable data schema to retrieve the system configuration variable data via one of a system of key value pairs and a hashtable hierarchy.

11. The system according to claim 10, wherein said data schema comprises configuration information and is at least partially in the form of a database.

12. The system according to claim 10, wherein said data schema comprises configuration information in the form of Lightweight Directory Access Protocol.

13. The system according to claim 11, wherein said application server and said data schema are remotely located to said plurality of client application servers and said configuration information is maintainable by a remote administrator.

14. The system according to claim 12, wherein said application server and said data schema are remotely located to said plurality of client application servers and said configuration information is maintainable by a remote administrator.

15. The system of claim 13, wherein data passes between said application servers and said application server in the form of a string.

16. The system of claim 14, wherein data passes between said application servers and said application server in the form of a string.

17. The system of claim 13, wherein data passes between said application servers and said application server in the form of a hashtables.

18. The system of claim 14, wherein data passes between said application servers and said application server in the form of a hashtables.

19. A server system containing multiple hardware devices for providing configuration services in response to requests from applications coupled to the server, the system comprising:
- a CORBA application server running an application program including application variables that configure the application for operation, wherein the CORBA application server generates a request for configuration variable data including at least an application ID and a key;
- an RMI application server running application program including application variables that configure the application for operation, wherein the RMI application server generates a request for configuration variable data including at least an application ID and a key, wherein further the key is a data string that identifies the configuration variable being requested;
- one or more internet application servers each running application program including application variables that configure the application for operation, wherein the internet application server generates a request for configuration variable data including at least an application ID and a key, the application servers providing the requests to the application properties server via a network;
- wherein the application servers are all in communication with a centralized application properties server, the centralized application properties server including means for creating a plurality of configurable properties server objects within the properties server, wherein each of the plurality of configurable properties server objects is configured to one of the client application servers in a round-robin fashion;
- one or more application programming interfaces capable of handling a plurality of software protocols in communication with the application properties server and the application servers; and
- a configuration variable data schema in communication with said network, for storing configuration variable data and accessible by said properties server to thereby obtain the configuration variable data and return it to the application server that has requested it, wherein the data schema comprise at least an APP table that maintains an entry for each application ID, a version table that maintains an entry for each version under each application ID and an APARM table that contains key-configuration variable data pairs.

20. The server system according to claim 19, wherein said data schema comprises a relational database.

21. The server system according to claim 19, wherein said configuration variables comply with Lightweight Directory Access Protocol.

22. The server system according to claim 19, wherein said one or more interfaces includes a CORBA server application.

23. The server system according to claim 22, wherein said one or more interfaces includes a server application for handling RMI requests.

24. The server system according to claim 23, wherein said one or more interfaces includes a common database access library, wherein said common database access library allows changes in said means for performing configuration services without affecting said plurality of client application servers.

25. The server system according to claim 24, wherein said one or more interfaces includes a database server coupled to said properties server.

26. The server system according to claim 19, further comprising a JAVA RMI Application Programming Interface.

27. The server system according to claim 26, further comprising a CORBA gateway.

28. The server system according to claim 27, wherein said properties server is implemented by a base RMI service in a service broker framework.

29. The server system according to claim 28, wherein said service broker framework is implemented using at least one XML service broker configuration file.

* * * * *